United States Patent
Kim

(10) Patent No.: US 10,908,480 B2
(45) Date of Patent: Feb. 2, 2021

(54) IRIS RECOGNITION CAMERA AND MOBILE TERMINAL INCLUDING SAME

(71) Applicant: LG INNOTEK CO., LTD., Seoul (KR)

(72) Inventor: Dae Hwan Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 309 days.

(21) Appl. No.: 16/025,408

(22) Filed: Jul. 2, 2018

(65) Prior Publication Data

US 2018/0307120 A1 Oct. 25, 2018

Related U.S. Application Data

(63) Continuation of application No. 15/526,944, filed as application No. PCT/KR2015/012092 on Nov. 11, 2015, now Pat. No. 10,042,234.

(30) Foreign Application Priority Data

Nov. 14, 2014 (KR) .................. 10-2014-0158685

(51) Int. Cl.
| | | |
|---|---|---|
| G02B 26/00 | (2006.01) | |
| G03B 13/34 | (2006.01) | |
| G02B 13/00 | (2006.01) | |
| G02B 3/12 | (2006.01) | |
| G03B 3/10 | (2006.01) | |
| G02B 3/14 | (2006.01) | |
| G06K 9/00 | (2006.01) | |

(52) U.S. Cl.
CPC ............ *G03B 13/34* (2013.01); *G02B 3/12* (2013.01); *G02B 3/14* (2013.01); *G02B 13/001* (2013.01); *G02B 26/004* (2013.01); *G03B 3/10* (2013.01); *G06K 9/0061* (2013.01); *G06K 9/00604* (2013.01)

(58) Field of Classification Search
CPC ....................................... G03B 13/34
USPC ....................................... 359/290
See application file for complete search history.

(56) References Cited

U.S. PATENT DOCUMENTS 7,142,368 B2 * 11/2006 Kim .................. G02B 3/14
359/666
2012/0294494 A1 11/2012 Britz et al.

FOREIGN PATENT DOCUMENTS

| JP | H11-327038 A | 11/1999 |
| KR | 2002-0028406 A | 4/2002 |
| KR | 10-2006-0119077 A | 11/2006 |
| KR | 10-0843473 B1 | 7/2008 |

OTHER PUBLICATIONS

International Search Report in International Application No. PCT/KR2015/012092, filed Nov. 11, 2015.

* cited by examiner

*Primary Examiner* — James C. Jones
(74) *Attorney, Agent, or Firm* — Saliwanchik, Lloyd & Eisenschenk

(57) ABSTRACT

One embodiment of an iris recognition camera can comprise: a liquid lens capable of adjusting the curvature of a lens front surface; a first adjusting part for adjusting the curvature of the front surface, of the liquid lens, to which the light is incident; an angle changing part rotating so as to change the angle in the direction of an optical axis of the liquid lens; and a second adjusting part for adjusting the rotational angle of the angle changing part.

19 Claims, 6 Drawing Sheets

IRIS RECOGNITION CAMERA AND MOBILE TERMINAL INCLUDING SAME

CROSS-REFERENCE TO RELATED APPLICATIONS

This application is a continuation of U.S. application Ser. No. 15/526,944, filed May 15, 2017, which is a U.S. national stage application of International Patent Application No. PCT/KR2015/012092, filed Nov. 11, 2015, which claims priority to Korean Application No. 10-2014-0158685, filed Nov. 14, 2014, the disclosures of each of which are incorporated herein by reference in their entirety.

TECHNICAL FIELD

Embodiments relate to an iris recognition camera and a mobile terminal including the same.

BACKGROUND ART

In this section, the following description merely provides information regarding the background of the embodiments, and does not constitute the conventional art.

An iris recognition system, which has higher security and accuracy than other authentication means, is used in identification and authentication for security entrance. An iris recognition system is a system that extracts characteristic iris patterns from iris images, taken by a camera, using an image processing technique, stores the extracted iris patterns as data, and compares the stored iris patterns with iris data of users registered in advance to authenticate a specific person.

In recent years, such an iris recognition system has been applied to mobile devices such that the mobile devices can be increasingly used as personal security systems. In the iris recognition system, however, the iris must be accurately recognized at the center of a lens of the camera in order to perform rapid and accurate security authentication.

Consequently, it is necessary for an iris recognition camera used in a general iris recognition system to perform optical-axis focusing in which the focus of the camera is aligned with a user's eye in order to perform more accurate and rapid iris recognition.

In addition, there is a necessity for an iris recognition camera that is capable of recognizing the irises of the left eye and the right eye of a user using a single lens without requiring a user to move, whereby it is not necessary for the user to move such that the irises of the left eye and the right eye of the user can be recognized by the camera or to provide two lenses for respectively recognizing the irises of the left eye and the right eye of the user in the iris recognition camera, thereby improving user convenience.

DISCLOSURE

Technical Problem

Embodiments provide an iris recognition camera that is capable of easily and rapidly recognizing the irises of the left eye and the right eye of a user and an iris recognition method using the same.

It should be noted that the objects of the disclosure are not limited to the objects mentioned above, and other unmentioned objects of the disclosure will be clearly understood by those skilled in the art to which the disclosure pertains from the following description.

Technical Solution

In one embodiment, an iris recognition camera includes a liquid lens, the curvature of the front surface of which is adjustable, a first adjustment unit for adjusting the curvature of the front surface of the liquid lens, on which light is incident, an angle change unit rotatable so as to change the angle of the liquid lens in an optical-axis direction, and a second adjustment unit for adjusting the rotational angle of the angle change unit.

The liquid lens may include a first membrane made of a flexible material and a first transparent fluid received in the first membrane.

A central part of the front surface of the first membrane, on which light is incident, may be configured to be convex forward.

The first adjustment unit may have a ring shape and may be configured such that one surface thereof contacts the edge of the front surface of the first membrane.

The first adjustment unit may push the edge of the front surface of the first membrane or release the pushed state thereof to move some of the first fluid received in the edge of the first membrane to the central part of the first membrane or to move some of the first fluid received in the central part of the first membrane to the edge of the first membrane, thereby adjusting the curvature of the front surface of the first membrane and thus adjusting the curvature of the front surface of the liquid lens.

The angle change unit may be disposed behind the liquid lens, and may include a second membrane made of a flexible material and a second transparent fluid received in the second membrane.

The second adjustment unit may have a ring shape and may be configured such that one surface thereof contacts the edge of the front surface of the second membrane.

The second adjustment unit may push a portion of the edge of the front surface of the second membrane or release the pushed state thereof to adjust the amount of the second fluid received in the second membrane and distributed in directions that are perpendicular to the optical-axis direction, thereby adjusting the rotational angle of the angle change unit and thus changing the angle of the liquid lens in the optical-axis direction.

The liquid lens and the angle change unit may be integrally coupled to each other such that, when the angle change unit is rotated, the liquid lens is also rotated.

The sectional area of the liquid lens in the optical-axis direction may be smaller than that of the angle change unit in the optical-axis direction.

The second adjustment unit may be configured to wrap the first adjustment unit.

In another embodiment, an iris recognition camera includes a first lens barrel including a liquid lens, the curvature of the front surface of which is adjustable, a first adjustment unit for adjusting the curvature of the front surface of the liquid lens, on which light is incident, an angle change unit rotatable so as to change the angle of the liquid lens in an optical-axis direction, and a second adjustment unit for adjusting the rotational angle of the angle change unit, a second lens barrel disposed behind the first lens barrel for condensing light from the first lens barrel, and a filter disposed behind the second lens barrel.

A central part of the front surface of the liquid lens may be configured to be convex forward.

The first adjustment unit may have a ring shape and may be configured such that one surface thereof contacts the edge of the front surface of the liquid lens.

The angle change unit may be disposed behind the liquid lens, and the sectional area of the angle change unit in the optical-axis direction may be larger than that of the liquid lens in the optical-axis direction.

The second adjustment unit may have a ring shape, may be disposed to wrap the first adjustment unit, and may be configured such that one surface thereof contacts the edge of the front surface of the angle change unit, excluding a portion thereof coupled to the liquid lens.

In another embodiment, an iris recognition camera includes a lens barrel including a liquid lens, the curvature of the front surface of which is adjustable, a first adjustment unit for adjusting the curvature of the front surface of the liquid lens, on which light is incident, an angle change unit rotatable so as to change the angle of the liquid lens in an optical-axis direction, and a second adjustment unit for adjusting the rotational angle of the angle change unit, and also includes a filter disposed behind the lens barrel.

In a further embodiment, a mobile terminal includes the iris recognition camera.

Advantageous Effects

In embodiments, an apparatus equipped with an iris recognition camera having a single liquid lens, such as a mobile terminal, may recognize the irises of the left eye and the right eye of a user. Consequently, it is possible to easily unlock and use a mobile device through simple and convenient iris recognition.

BEST MODE

Figure 1:
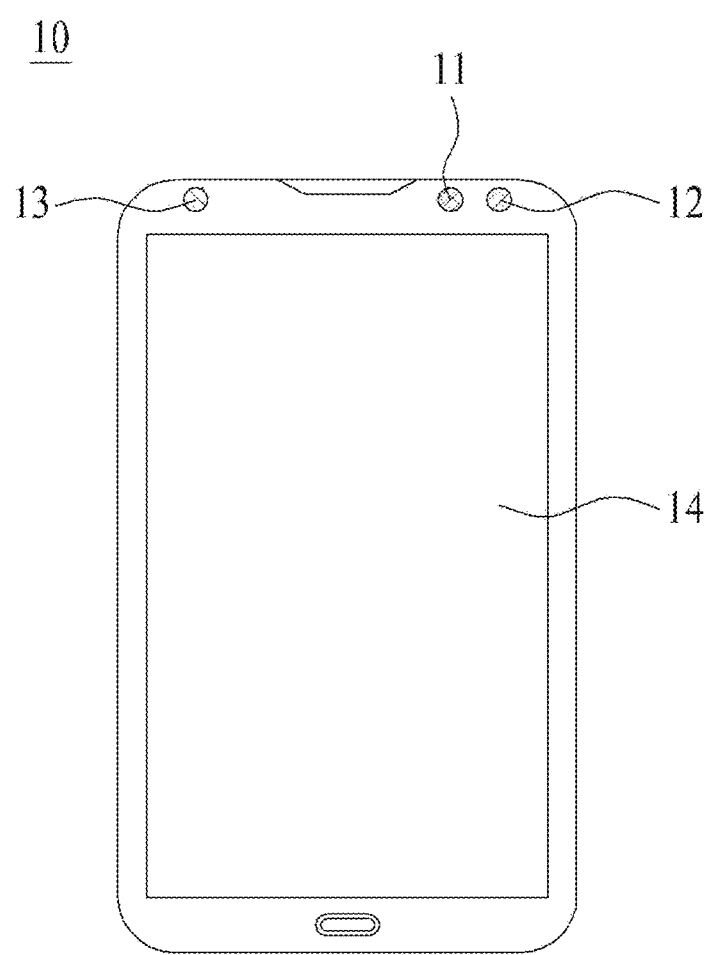
FIG. 1 is a schematic view showing a mobile terminal according to an embodiment.

Reference will now be made in detail to the preferred embodiments, examples of which are illustrated in the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments. In the drawings, sizes and shapes of elements may be exaggerated for convenience and clarity of description.

It may be understood that, although the terms "first," "second," etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under," "under the element" as well as "on the element" may be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements.

Furthermore, in the drawings, a rectangular coordinate system (x, y, z) may be used. In the drawings, the x axis and the y axis are axes perpendicular to an optical axis. For the sake of convenience, an optical axis (z-axis) direction may be referred to as a first direction, an x-axis direction may be referred to as a second direction, and a y-axis direction may be referred to as a third direction.

Figure 2:
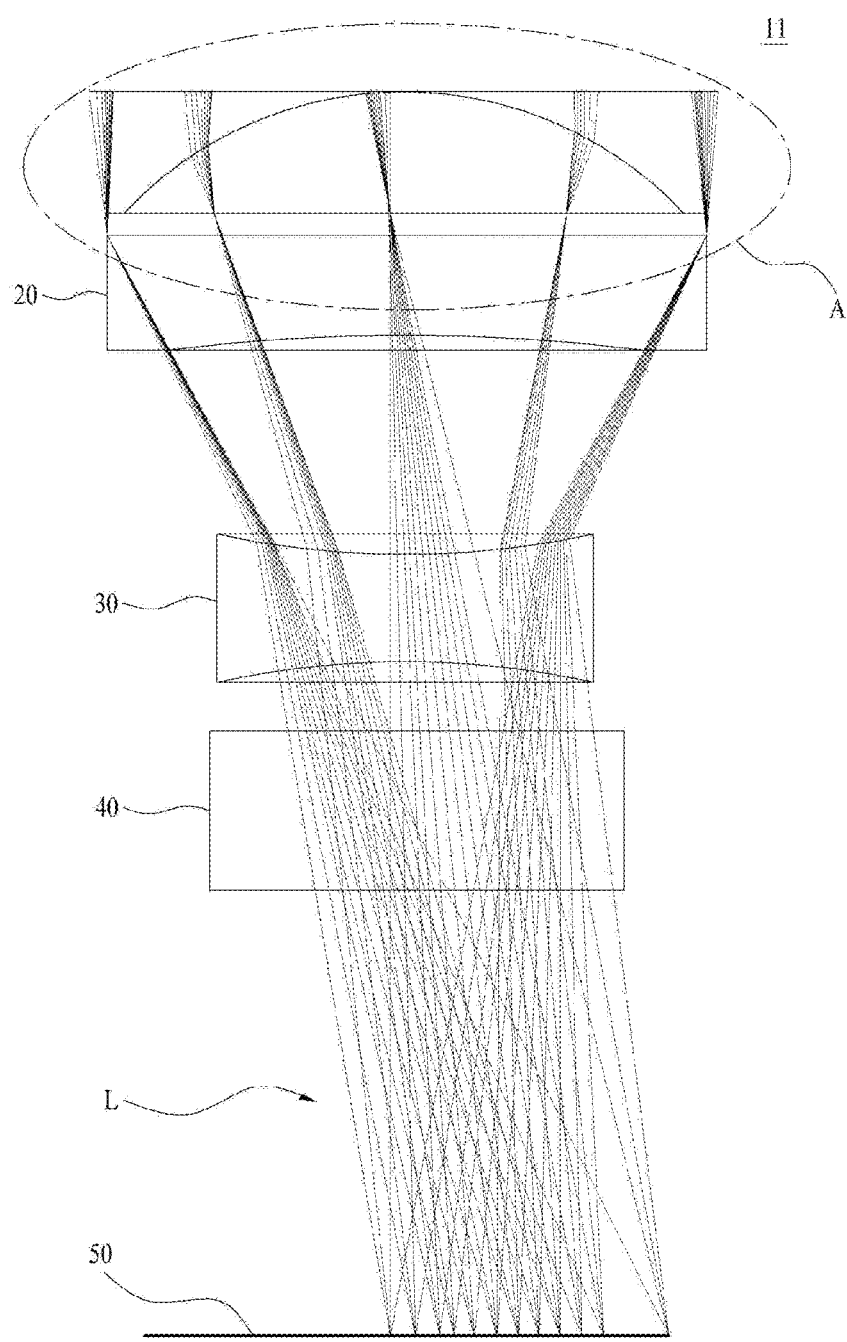
FIG. 2 is a schematic view showing an iris recognition camera according to an embodiment.

FIG. 1 is a schematic view showing a mobile terminal 10 according to an embodiment. FIG. 2 is a schematic view showing an iris recognition camera 11 according to an embodiment.

As shown in FIG. 1, the mobile terminal 10 may include an iris recognition camera 11, a front camera 12, an infrared light emitting module 13, and a display unit 14.

The iris recognition camera 11 takes an image of a user's iris and recognizes the iris. When the recognized iris is identical to a predetermined iris, it is possible to unlock the mobile terminal 10, which is locked for security. In this embodiment, irises of the two eyes of a user, that is, the left eye and the right eye, may be recognized using a single iris recognition camera 11. Consequently, it is preferable to install the iris recognition camera 11 in the front of the mobile terminal 10. The details of the iris recognition camera 11 will be described later.

The front camera 12 is used to take general images other than the image taken by the iris recognition camera 11. The infrared light emitting module 13 may include a light emitting diode for emitting infrared light. In addition, the iris image taken by the iris recognition camera 11 may be displayed on the display unit 14 of the mobile terminal 10.

In addition, the iris image taken by the iris recognition camera 11 may be provided so as to be used for other functions of the mobile terminal 10. For example, the iris image may be used for a security system. However, the disclosure is not limited thereto.

In iris recognition using the mobile terminal 10, data information about reference iris images that are compared with the iris image taken by the mobile terminal 10 may be stored in a memory of the mobile terminal 10. In the mobile terminal 10 of this embodiment, the iris recognition camera 11 is included. In the mobile terminal 10, therefore, a security system using iris recognition may be used.

As shown in FIG. 2, the iris recognition camera 11 may include a first lens barrel 20, a second lens barrel 30, a filter 40, and an image sensor 50.

The first lens barrel 20 is a part on which incident light L containing an image of a subject, i.e. an iris of a user's eye, is incident. The first lens barrel 20 may be coupled to the mobile terminal 10 in various manners.

For example, a female thread may be formed in the inner circumference of a hole formed in the mobile terminal 10, and a male thread corresponding to the female thread may be formed in the outer circumference of the first lens barrel 20 such that the first lens barrel 20 is coupled to the mobile terminal 10 by thread engagement therebetween.

However, the disclosure is not limited thereto. No thread may be formed in the inner circumference of the hole formed in the mobile terminal 10, and the first lens barrel 20 may be directly fixed to the inside of the hole using methods other than thread engagement.

In addition, one or more lenses may be directly coupled to the mobile terminal 10 without using the first lens barrel 20. A single lens may be coupled to the first lens barrel 20, or two or more lenses may be coupled to the first lens barrel 20 so as to constitute an optical system.

The second lens barrel 30 is disposed behind the first lens barrel 20. The incident light L from the first lens barrel 20 is condensed while passing through the second lens barrel 30. In the same manner as the first lens barrel 20, a single lens may be coupled to the second lens barrel 30, or two or more lenses may be coupled to the second lens barrel 30 so as to constitute an optical system.

The filter 40 is disposed behind the second lens barrel 30, and may serve to block a specific component of the incident light L passing through the second lens barrel 30 so as not to pass through the filter 40. The filter 40 may be an infrared blocking filter.

The image sensor 50 is disposed behind the filter 40, and is a part on which the iris image contained in the incident light L that has passed through the filter 40 is formed. The iris image formed on the image sensor 50 may be converted into an electrical signal, which may be stored in the memory of the mobile terminal 10, or may be displayed on the display unit 14.

Figure 3:
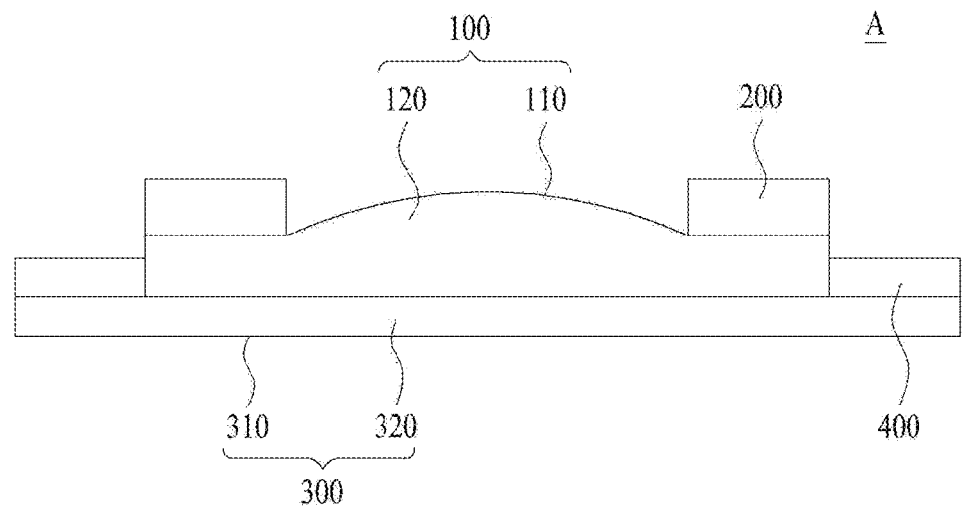
FIG. 3 is a schematic sectional view showing elements mounted in part A of a first lens barrel of FIG. 2.
Figure 4:
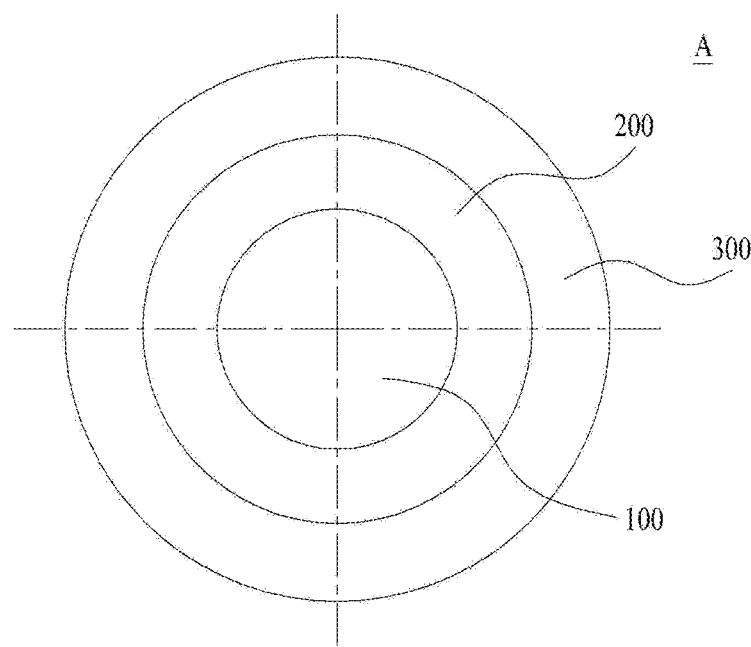
FIG. 4 is a schematic plan view showing the elements mounted in part A of the first lens barrel of FIG. 2.

FIG. 3 is a schematic sectional view showing elements mounted in part A of the first lens barrel 20 of FIG. 2. FIG. 4 is a schematic plan view showing the elements mounted in part A of the first lens barrel 20 of FIG. 2. A liquid lens 100, a first adjustment unit 200, an angle change unit 300, and a second adjustment unit 400 may be mounted in the first lens barrel 20.

The liquid lens 100 may be configured such that the curvature of the front surface thereof is adjustable, and may include a first membrane 110 and a first fluid 120 and 120.

The first membrane 110 is a membrane made of a flexible material, in which the first fluid 120 and 120 is received. Consequently, the shape of the first membrane 110, particularly the curvature of the front surface of the first membrane 110, may be changed and adjusted depending on the change in distribution of the first fluid 120 and 120 received in the first membrane 110.

The central part of the front surface of the first membrane 110, on which light is incident, may be configured to be convex forward. Optical-axis focusing, in which the focus of the liquid lens 100 is aligned with the user's eye, may be performed by adjusting the curvature of the convex shape. Such curvature adjustment may be performed by the first adjustment unit 200, which will be described later. Meanwhile, the optical-axis direction is indicated by the center line in FIGS. 3, 5, and 6.

The first fluid 120 and 120 is received in the first membrane 110, and may be made of a transparent material that allows the incident light L to pass therethrough. That is, the first fluid 120 and 120 may serve as a medium of the liquid lens 100 through which the incident light L passes.

The refractive index of the incident light L passing through the first fluid 120 and 120 may be changed depending on the kind of the first fluid 120 and 120. Consequently, a transparent material having a desired refractive index may be selected as the first fluid 120 and 120 in consideration of the structure, the operation characteristics, etc. of the first lens barrel 20 and the iris recognition camera 11 including the same.

The first adjustment unit 200 may serve to adjust the curvature of the front surface of the liquid lens 100, on which light is incident. For example, the first adjustment unit 200 may adjust the curvature of the front surface of the first membrane 110 to adjust the curvature of the front surface of the liquid lens 100, thereby performing optical-axis focusing of the liquid lens 100.

The first adjustment unit 200 may have a ring shape, and may be configured such that one surface thereof contacts the edge of the front surface of the first membrane 110. The first adjustment unit 200 may be moved in the optical-axis direction of the liquid lens 100 by an additional device, which is not shown, so as to adjust the curvature of the liquid lens 100.

That is, the first adjustment unit 200 may push the edge of the front surface of the first membrane 110 or may release the pushed state thereof to move some of the first fluid 120 and 120 received in the edge of the first membrane 110 to the central part of the first membrane 110 or to move some of the first fluid 120 and 120 received in the central part of the first membrane 110 to the edge of the first membrane 110, thereby adjusting the curvature of the front surface of the first membrane 110 and thus adjusting the curvature of the front surface of the liquid lens 100.

Specifically, when the first adjustment unit 200 moves downward in FIG. 3, at least some of the first fluid 120 and 120 received in the edge of the first membrane 110 moves to the central part of the first membrane 110, with the result that the amount of first fluid 120 and 120 in the central part of the first membrane 110 is increased, whereby the convex shape of the central part becomes more convex, and thus the curvature thereof is increased.

On the other hand, when the first adjustment unit 200 moves upward in FIG. 3, at least some of the first fluid 120 and 120 received in the central part of the first membrane 110 moves to the edge of the first membrane 110, with the result that the amount of first fluid 120 and 120 in the edge of the first membrane 110 is increased, whereby the convex shape of the central part becomes flat and thus the curvature thereof is decreased.

The first adjustment unit 200 may adjust the curvature of the liquid lens 100 as described above. Consequently, optical-axis focusing, in which the focus of the liquid lens 100 is aligned with the user's eye, may be performed.

The angle change unit 300 may rotate about an imaginary axis, i.e. the x axis and/or the y axis, perpendicular to the optical axis, i.e. the z axis, to change the angle of the liquid lens 100 in the optical-axis direction.

The angle change unit 300 may be disposed behind the liquid lens 100, and may include a second membrane 310 and a second fluid 320. The sectional area of the liquid lens 100 in the optical-axis direction may be smaller than that of the angle change unit 300 in the optical-axis direction. The second adjustment unit 400, which will be described later, may be disposed at a portion of the front surface of the angle change unit 300 excluding a portion thereof corresponding to the liquid lens 100.

Meanwhile, the rear surface of the liquid lens 100 may be fixedly coupled to the front surface of the angle change unit 300 using a coupling material, such as an adhesive. When the angle change unit 300 is rotated, therefore, the liquid lens 100 may also be rotated, since the liquid lens 100 and the angle change unit 300 are integrally coupled to each other.

The second membrane 310 is a membrane made of a flexible material, in which the first fluid 120 is received. Consequently, the shape of the second membrane 310, particularly the rotational angle of the front surface of the second membrane 310 about the x axis and/or the y axis, may be changed and adjusted depending on the change in distribution of the second fluid 320 received in the second membrane 310.

The rotational angle of the front surface of the second membrane 310 may be adjusted to change the angle of the liquid lens 100 in the optical-axis direction such that the optical axis is aligned with the iris of the user's eye. The rotational angle of the front surface of the second membrane 310 may be adjusted by the second adjustment unit 400, which will be described later.

The second fluid 320 is received in the second membrane 310, and may be made of a transparent material that allows the incident light L to pass therethrough. That is, the second fluid 320 may serve as a medium of the angle change unit 300 through which the incident light L passes.

The refractive index of the incident light L passing through the second fluid 320 may be changed depending on the kind of the second fluid 320. Consequently, a transparent material having a desired refractive index may be selected as the second fluid 320 in consideration of the structure, the operational characteristics, etc. of the first lens barrel 20 and the iris recognition camera 11 including the same.

Meanwhile, the first fluid 120 and 120 and the second fluid 320 may be of the same kind or different kinds. In the case in which the first fluid 120 and 120 and the second fluid 320 are of different kinds, the first fluid 120 and 120 and the second fluid 320 have different refractive indices. For this reason, it is preferable to select the kinds of the first fluid 120 and 120 and the second fluid 320 in consideration of the structure, the operation characteristics, the performance, etc. of the iris recognition camera 11 such that the first fluid 120 and 120 and the second fluid 320 have appropriate refractive indices.

The second adjustment unit 400 may serve to adjust the rotational angle of the angle change unit 300 about the x axis and/or the y axis. For example, the second adjustment unit 400 may adjust the rotational angle of the front surface of the second membrane 310 to change the angle of the liquid lens 100 in the optical-axis direction such that the optical axis is aligned with the iris of the user's eye.

The second adjustment unit 400 may have a ring shape, and may be configured such that one surface thereof contacts the edge of the front surface of the second membrane 310. In addition, the second adjustment unit 400 may be configured to wrap the first adjustment unit 200.

In addition, the second adjustment unit 400 may be configured such that one surface thereof contacts a portion of the edge of the front surface of the angle change unit 300 excluding a portion thereof coupled to the liquid lens 100. The first adjustment unit 200 may be rotated about the x axis and/or the y axis by an additional device, which is not shown, so as to adjust and change the rotation angle of the angle change unit 300 about the x axis and/or the y axis.

That is, the second adjustment unit 400 may push a portion of the edge of the front surface of the second membrane 310, or may release the pushed state thereof to adjust the amount of second fluid 320 received in the second membrane 310 and distributed in the x-axis direction and/or the y-axis direction, which is perpendicular to the optical-axis direction, i.e. the z-axis direction, thereby adjusting the rotational angle of the angle change unit 300 and thus changing the angle of the liquid lens 100 in the optical-axis direction.

Figure 5:
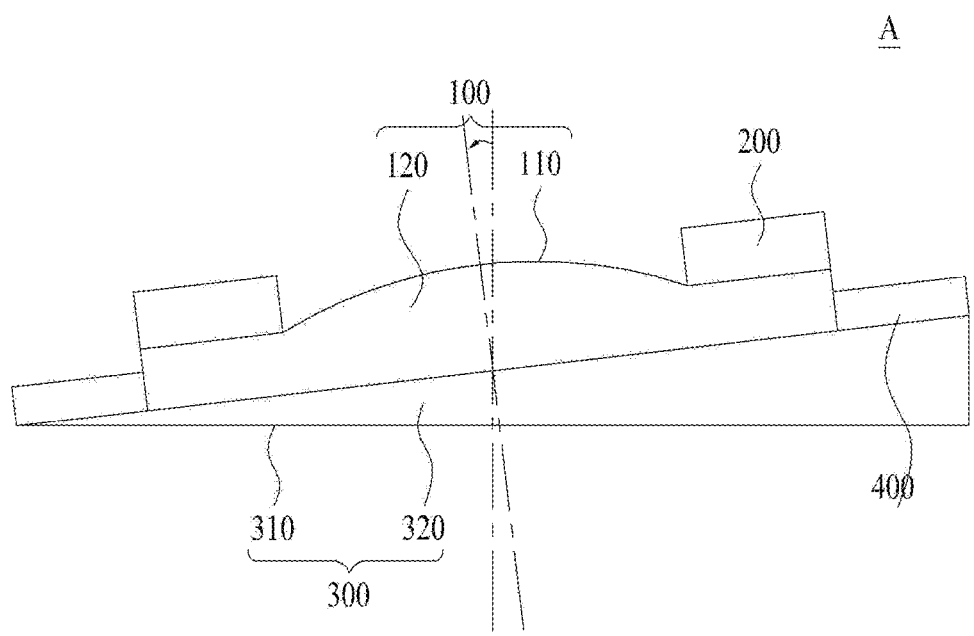
FIGS. 5 and 6 are schematic views illustrating the operation of the iris recognition camera according to the embodiment.
Figure 6:
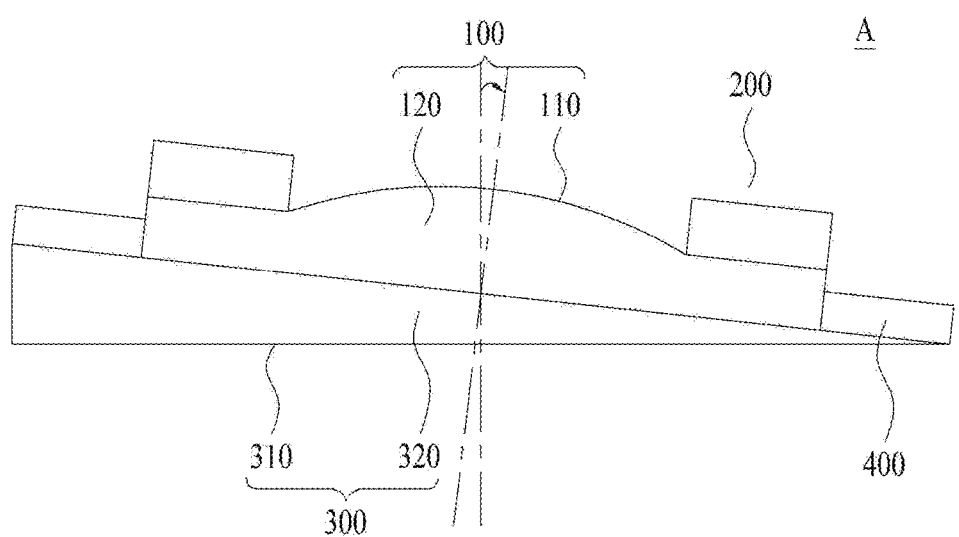

FIGS. 5 and 6 are schematic views illustrating the operation of the iris recognition camera 11 according to the embodiment.

When the left part of the second adjustment unit 400 is pushed downward or the right part of the second adjustment unit 400 is pulled upward to rotate the optical-axis direction of the liquid lens 100 in the counterclockwise direction, as shown in FIG. 5, at least some of the second fluid 320 received in the left part of the angle change unit 300 moves to the right part of the angle change unit 300.

As a result, the left part of the upper surface of the second membrane 310 of the angle change unit 300 moves downward and the right part thereof moves upward. Consequently, the second membrane 310 is rotated about the x axis or the y axis in the counterclockwise direction, whereby the optical axis, which is perpendicular to the x axis and the y axis, may be rotated in the counterclockwise direction, as shown.

Even in the case in which the optical axis of the liquid lens 100 is rotated in the clockwise direction, as shown in FIG. 6, such rotation may be performed in a manner similar to FIG. 5.

That is, when the right part of the second adjustment unit 400 is pushed downward or the left part of the second adjustment unit 400 is pulled upward to rotate the optical-axis direction of the liquid lens 100 in the clockwise direction, as shown in the figure, at least some of the second fluid 320 received in the right part of the angle change unit 300 moves to the left part of the angle change unit 300.

As a result, the right part of the upper surface of the second membrane 310 of the angle change unit 300 moves downward and the left part thereof moves upward. Consequently, the second membrane 310 is rotated about the x axis or the y axis in the clockwise direction, whereby the optical-axis direction, which is perpendicular to the x axis and the y axis, may be rotated in the clockwise direction, as shown.

The optical-axis direction of the liquid lens 100 may be rotated in the clockwise direction or in the counterclockwise direction, as described above, such that the optical axis of the liquid lens 100 is aligned with the iris of the user's eye. Meanwhile, in FIGS. 5 and 6, rotation about one selected from between the x axis and the y axis has been described. Alternatively, an appropriate portion of the second adjustment unit 400 may be pushed downward or pulled upward such that the angle change unit 300 is rotated simultaneously about the x axis and the y axis.

Consequently, it is possible to perform two-dimensional rotation in which the optical-axis direction is rotated simultaneously about the x axis and the y axis.

Meanwhile, the rotational angle of the optical axis, including the rotational angle in the counterclockwise rotation of FIG. 5 and the rotational angle in the clockwise rotation of FIG. 6, may be about 5 to 10 degrees. Consequently, the thickness w (see FIG. 3) of the angle change unit 300 in the optical-axis direction may be designed to be about 0.2 mm or less, preferably 0.05 mm to 0.2 mm.

Consequently, it is necessary to miniaturize the elements provided in the first lens barrel 20. Such miniaturization may be achieved using micro electro mechanical systems (MEMS).

Figure 7:
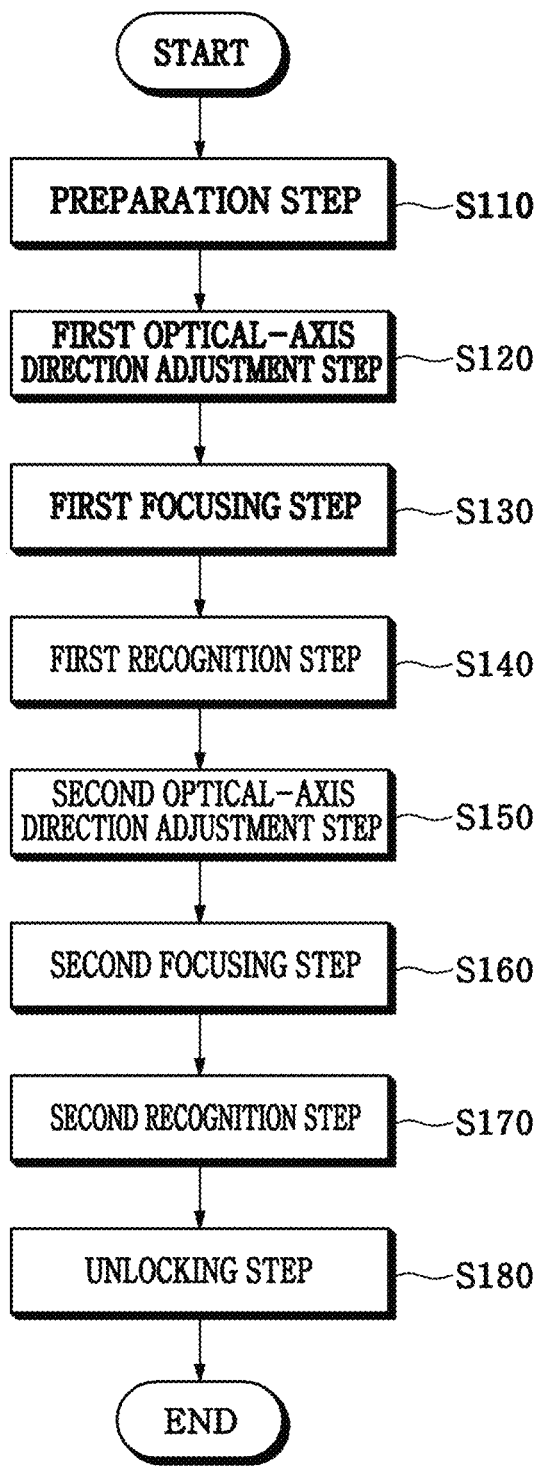
FIG. 7 is a flowchart illustrating an iris recognition method according to an embodiment.

FIG. 7 is a flowchart illustrating an iris recognition method according to an embodiment.

The iris recognition method may include a preparation step (S110), a first optical-axis direction adjustment step (S120), a first focusing step (S130), a first recognition step (S140), a second optical-axis direction adjustment step (S150), a second focusing step (S160), a second recognition step (S170), and an unlocking step (S180).

At the preparation step (S110), a user's eye is located in front of the liquid lens 100 such that the iris recognition camera 11 recognizes the iris of the user's eye. At this time, the distance between the iris recognition camera 11 and the user's eye may be about 200 mm in consideration of the recognition distance of the iris recognition camera 11.

At the first optical-axis direction adjustment step (S120), the angle of the liquid lens 100 in the optical-axis direction is changed such that one of the user's eyes is aligned with the optical-axis direction. At this time, the angle of the liquid lens 100 in the optical-axis direction may be adjusted using the second adjustment unit 400, as described above.

At the first focusing step (S130), the curvature of the front surface of the liquid lens 100 is adjusted such that the focus of the liquid lens 100 is aligned with the user's eye. At this time, the curvature of the front surface of the liquid lens 100 may be adjusted and changed using the first adjustment unit 200, as described above.

At the first recognition step (S140), the camera recognizes the iris of the user's eye. At this time, in the case in which the recognized iris is not the iris of s user stored as data in advance, the procedure may be finished without performing subsequent steps.

At the second optical-axis direction adjustment step (S150), the angle of the liquid lens 100 in the optical-axis direction is changed such that the other of the user's eyes is aligned with the optical-axis direction. At this time, the angle of the liquid lens 100 in the optical-axis direction may be adjusted using the second adjustment unit 400, as described above.

At the second focusing step (S160), the curvature of the front surface of the liquid lens 100 is adjusted such that the focus of the liquid lens 100 is aligned with the user's eye. At this time, the curvature of the front surface of the liquid lens 100 may be adjusted and changed using the first adjustment unit 200, as described above.

At the second recognition step (S170), the camera recognizes the iris of the user's eye. At this time, in the case in which the recognized iris is not the iris of a user stored as data in advance, the procedure may be finished without performing subsequent steps.

At the unlocking step (S180), an apparatus in which the iris recognition camera 11 is mounted is unlocked. As a result, the user may use the apparatus in which the iris recognition camera 11 is mounted, such as a mobile terminal 10.

In embodiments, an apparatus equipped with an iris recognition camera 11 having a single liquid lens 100, such as a mobile terminal 10, may recognize the irises of the left eye and the right eye of a user. Consequently, it is possible to easily unlock and use the mobile terminal 10 through simple and convenient iris recognition.

Although only a few embodiments have been described above, various other embodiments may be configured. The technical features of the embodiments described above may be combined into various forms unless the technical features are incompatible with each other, in which case it is possible to configure new embodiments.

INDUSTRIAL APPLICABILITY

In embodiments, an apparatus equipped with an iris recognition camera having a single liquid lens, such as a mobile terminal, may recognize the irises of the left eye and the right eye of a user. Consequently, the embodiments have industrial applicability.

The invention claimed is:

1. An iris recognition camera, comprising:
   a liquid lens including first fluid and second fluid;
   a filter disposed under the liquid lens;
   an image sensor disposed under the filter;
   a lens disposed between the liquid lens and the image sensor; and
   a first adjustment unit having a ring shape and configured such that one surface thereof contacts an edge of a front surface of the liquid lens to adjust the first fluid.

2. The iris recognition camera according to claim 1, wherein a central part of the front surface of the liquid lens is configured to be convex forward.

3. The iris recognition camera according to claim 1, comprising a second adjustment unit that adjusts the second fluid.

4. The iris recognition camera according to claim 3, comprising an angle change unit disposed behind the liquid lens,
   wherein a sectional area of the angle change unit in an optical-axis direction is larger than a sectional area of the liquid lens in the optical-axis direction.

5. The iris recognition camera according to claim 4, wherein the second adjustment unit has a ring shape, is disposed to wrap the first adjustment unit, and is configured such that one surface thereof contacts an edge of a front surface of the angle change unit excluding a portion thereof coupled to the liquid lens.

6. The iris recognition camera according to claim 3, wherein the liquid lens comprises:
   a first membrane made of a flexible material; and
   a first transparent fluid received in the first membrane.

7. The iris recognition camera according to claim 6, wherein the first adjustment unit pushes an edge of a front surface of the first membrane or releases a pushed state thereof to move some of the first fluid received in the edge of the first membrane to a central part of the first membrane or to move some of the first fluid received in the central part of the first membrane to the edge of the first membrane, which thereby adjusts a curvature of the front surface of the first membrane and thus adjusts the curvature of the front surface of the liquid lens.

8. The iris recognition camera according to claim 5, wherein the angle change unit includes:
   a second membrane made of a flexible material; and
   a second transparent fluid received in the second membrane.

9. The iris recognition camera according to claim 8, wherein the second adjustment unit pushes a portion of an edge of a front surface of the second membrane or releases a pushed state thereof to adjust the amount of the second fluid received in the second membrane and distributed in directions that are perpendicular to the optical-axis direction, which thereby adjusts a rotational angle of the angle change unit and thus changes the angle of the liquid lens in the optical-axis direction.

10. The iris recognition camera according to claim 8, wherein the liquid lens and the angle change unit are integrally coupled to each other such that, when the angle change unit is rotated, the liquid lens is also rotated.

11. The iris recognition camera according to claim 4, wherein the angle change unit rotates about an imaginary axis perpendicular to an optical axis.

12. The iris recognition camera according to claim 4, wherein a rear surface of the liquid lens is fixedly coupled to a front surface of the angle change unit using a coupling material.

13. The iris recognition camera according to claim 8, wherein a rotational angle of a front surface of the second membrane about an imaginary axis perpendicular to an optical axis is changed and adjusted depending on change in distribution of the second fluid received in the second membrane.

14. The iris recognition camera according to claim 8, wherein a rotational angle of a front surface of the second membrane is adjusted to change the angle of the liquid lens in the optical-axis direction.

15. The iris recognition camera according to claim 8, wherein a rotational angle of a front surface of the second membrane is adjusted by the second adjustment unit.

16. The iris recognition camera according to claim 4, wherein the second fluid serves as a medium of the angle change unit through which an incident light passes.

17. The iris recognition camera according to claim 1, the first fluid and the second fluid are of the same kind.

18. The iris recognition camera according to claim 1, the first fluid and the second fluid are of different kinds.

19. A method for recognizing an iris by a mobile terminal that includes a camera having a liquid lens, the method comprising:

focusing on the iris by adjusting the liquid lens;

comparing the iris with an iris data that is stored in the mobile terminal in advance of focusing on the iris, in order to obtain a comparison result of the iris and the iris data; and determining whether to unlock the mobile terminal based on the comparison result, wherein the mobile terminal is unlocked if the comparison result indicates the iris matches the iris data and the mobile terminal remains locked if the comparison result indicates the iris does not match the iris data, wherein the liquid lens includes first fluid and second fluid, wherein the focusing on the iris is accomplished by adjusting the first fluid or the second fluid, and wherein the camera comprises an adjustment unit having a ring shape and configured such that one surface thereof contacts an edge of a front surface of the liquid lens.

* * * * *